US006866603B2

(12) United States Patent
Ackerman et al.

(10) Patent No.: US 6,866,603 B2
(45) Date of Patent: Mar. 15, 2005

(54) COUNTER-ROTATIONAL DRIVE BELT SYSTEM AND METHOD

(75) Inventors: Mark Alan Ackerman, Lincoln, NE (US); Travis Ray Toline, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 115 days.

(21) Appl. No.: 10/321,113

(22) Filed: Dec. 17, 2002

(65) Prior Publication Data

US 2004/0116225 A1 Jun. 17, 2004

(51) Int. Cl.[7] ................................................. F16H 7/00
(52) U.S. Cl. ...................................... 474/148; 474/202
(58) Field of Search ................................ 474/148, 152, 474/202, 205, 237

(56) References Cited

U.S. PATENT DOCUMENTS

| | | | |
|---|---|---|---|
| 3,726,386 A | 4/1973 | Chisholm | 198/33 AC |
| 3,786,684 A | 1/1974 | Freier, Jr. | 74/230.17 D |
| 3,838,771 A | 10/1974 | Whiteford | 198/238 |
| 3,948,109 A | * 4/1976 | Elonen | 74/61 |
| 3,995,506 A | 12/1976 | Poe | 74/231 MB |
| 4,792,034 A | 12/1988 | Leemkuil | 198/372 |
| 4,815,265 A | 3/1989 | Guinn et al. | 56/297 |
| 5,067,358 A | * 11/1991 | Ancrenaz | 74/61 |
| 5,209,705 A | 5/1993 | Gregg | 474/204 |
| 5,421,789 A | 6/1995 | Gregg | 474/153 |
| 5,624,337 A | 4/1997 | Macchiarulo et al. | 474/205 |
| 5,669,841 A | 9/1997 | Schick | 474/135 |

FOREIGN PATENT DOCUMENTS

JP 6-184848 * 7/1994 ............ D02G/1/04

* cited by examiner

*Primary Examiner*—David A. Bucci
*Assistant Examiner*—Vicky A. Johnson
(74) *Attorney, Agent, or Firm*—Richard B. O'Planick

(57) ABSTRACT

A belt drive system for use in a positive drive application includes a transmission belt having a row of drive teeth spaced apart along a first side and a non-toothed opposite second side. The system includes a driver pulley, a counter-rotating driven pulley or pulleys, and the transmission belt. The counter-rotation is achieved by the incorporation of a 180 degree twist in a belt span between the driver pulley and the driven pulley and a recovery twist in a second belt span from the driven pulley back to the driver pulley.

19 Claims, 2 Drawing Sheets

COUNTER-ROTATIONAL DRIVE BELT SYSTEM AND METHOD

FIELD OF THE INVENTION

The invention relates generally to positive drive belt systems and, more specifically, to belt drive systems for effecting a counter-rotational relationship between a driver and driven pulleys.

BACKGROUND OF THE INVENTION

Drive belt systems are in widespread use. For example, within the automotive industry, systems consisting of a driver pulley and or pulleys, a driven pulley, idler pulley(s), and a transmission belt are utilized in transmission systems. The belts in use in such applications are composed of a resilient elastomer reinforced with one or more reinforcing members extending therealong. One or more rows of teeth are uniformly spaced apart in the longitudinal direction along one surface of the belt, the opposite surface being substantially smooth and toothless. The teeth positively engage complimentary cavities within a driver pulley and a driven pulley as the belt rotates. The driver pulley and the driven pulley(s) are thus rotated in a common direction in synchronous fashion. The configuration of the teeth and cavities are relatively complex and the performance requirements demanded of the belt are rigorous, making the belts intended for such applications relatively difficult and expensive to fabricate. U.S. Pat. No. 5,209,705 teaches a drive belt, and U.S. Pat. No. 5,421,789 a drive pulley, configured as described and are hereby incorporated herein by reference.

In other applications, it is common to counter-rotate a driven pulley off a driver pulley through the use of a two sided drive belt. Counter-rotation can serve to economize space and is mechanically advantageous in certain system configurations. To achieve such a result, the driver pulley generally drives the belt by engagement with one belt surface and the driven pulley is engaged by the opposite surface of the belt. Counter-rotation of the driven pulley relative to the driver pulley results.

Counter-rotation of a driven pulley relative to a driver pulley in synchronous, positive drive belt applications such as in automotive transmissions has, however, been difficult to achieve. To accomplish such an objective, a fabrication of row(s) of teeth on both opposite surfaces of the belt would be required. The cost of manufacturing such a belt would prove cost prohibitive. Secondly, the required durability and performance criteria needed for such applications would be difficult to achieve with a dual sided drive belt. Fabricating a double-sided toothed belt suitable for synchronous, positive drive belt systems that can effect a counter-rotation relationship between pulleys has, therefore, proven elusive.

The industry, accordingly, remains in need of a method and system for achieving counter-rotation between a driver pulley and driven pulley(s) in a synchronous positive drive belt system. The method and system should facilitate such an objective without requiring a customized drive belt that would be difficult and expensive to fabricate. Moreover, the belt used in a counter-rotational system should meet the same high performance standards and criteria demanded of existing one-sided belts.

SUMMARY OF THE INVENTION

A drive belt system and method for use in a positive drive belt applications is disclosed. In one aspect of the invention, the system includes a transmission belt having a row of drive teeth spaced apart along a first side and a non-toothed opposite second side. The system includes a driver pulley, a counter-rotating driven pulley or pulleys, and the transmission belt. The counter-rotation is achieved by the incorporation of a 180 degree twist in a belt span between the driver pulley and the driven pulley and a recovery twist in a second belt span from the driven pulley back to the driver pulley. In another aspect of the invention, a method is disclosed for achieving counter-rotation of a driven pulley in a positive drive belt application wherein a one-sided toothed positive drive belt, similar to that used in conventional systems, is deployed. The method comprises the steps of extending the belt between a driven and a driver pulley; rotatably engaging and driving the driver pulley with the toothed side of the belt; forming a first twist in a span of the belt between the driver pulley and the driven pulley to drive the driven pulley in an opposite direction, and forming a recovery twist in a second span of the belt between the driven pulley and the driver pulley.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
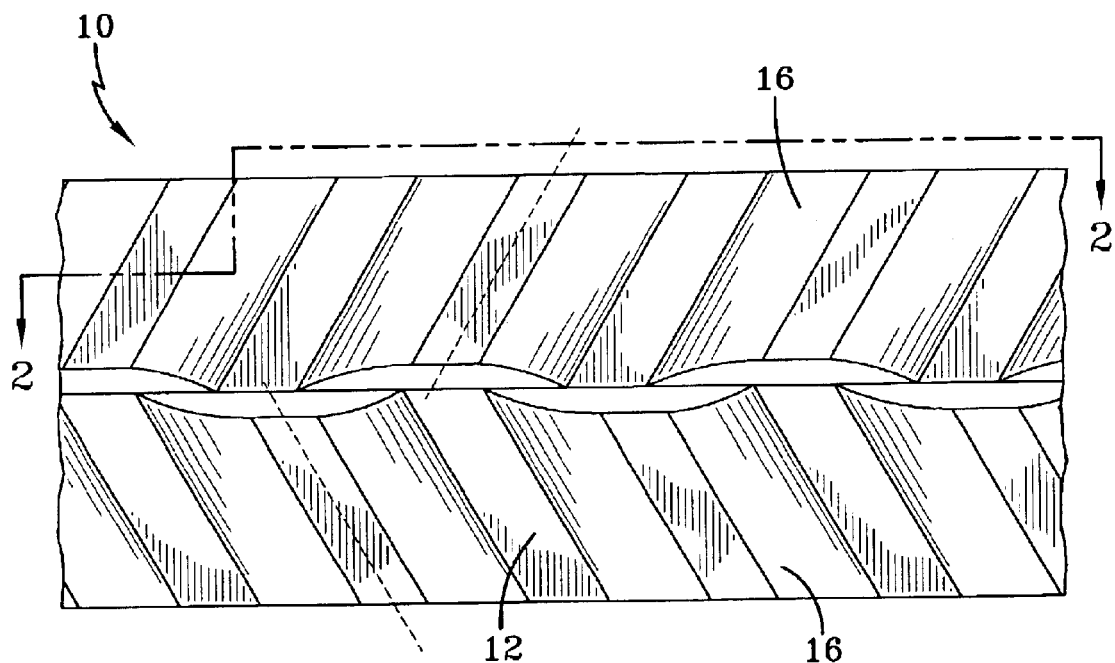
FIG. 1 is a bottom plan view of a portion of a synchronous drive belt suitable for use in accordance with the present invention.
Figure 2:
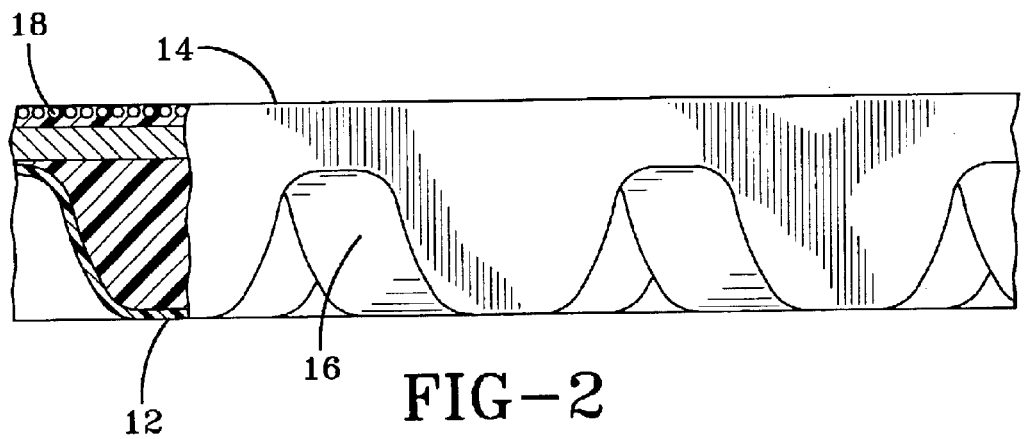
FIG. 2 is a side view partly in section taken along the line 2—2 of FIG. 1.
Figure 3:
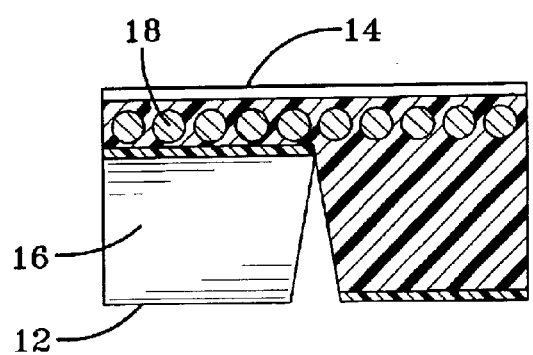
FIG. 3 is a transverse cross-sectional view of the belt taken along the line 3—3 of FIG. 2.

The drawings illustrate a synchronous drive belt 10 of a type in use in conventional drive systems such as in automotive transmission applications. A belt 10 such as shown in FIGS. 1–3 includes a toothed surface 12 and a planar opposite untoothed surface 14. Spaced apart along the surface 12 are a series of drive teeth 16. The belt is made of a resilient elastomer and reinforced with a longitudinal tensile member 18 made up of a plurality of cords of a high elastic modulus. Such cords may be made from glass fiber, carbon fiber, steel, polyester, high tenacity rayon or, preferably, polyaramide. Such a belt is disclosed in U.S. Pat. No. 5,209,705, incorporated by reference herein.

The tooth surface 12 of the belt 10 may, if required, be reinforced with an abrasion resistant fabric such as nylon. The elastomers may be any one of those known to be suitable for use in such belts, e.g. polychloroprene, polyurethane, NBR, IIR, SBR, CSM, EPDM, other thermosets, thermoplastic elastomers and other polymer alloys. The belt 10 may have adjacent rows of teeth 16 or a single row of teeth if required or desired. Teeth 16 may be uniformly spaced apart in the longitudinal direction.

Figure 4:
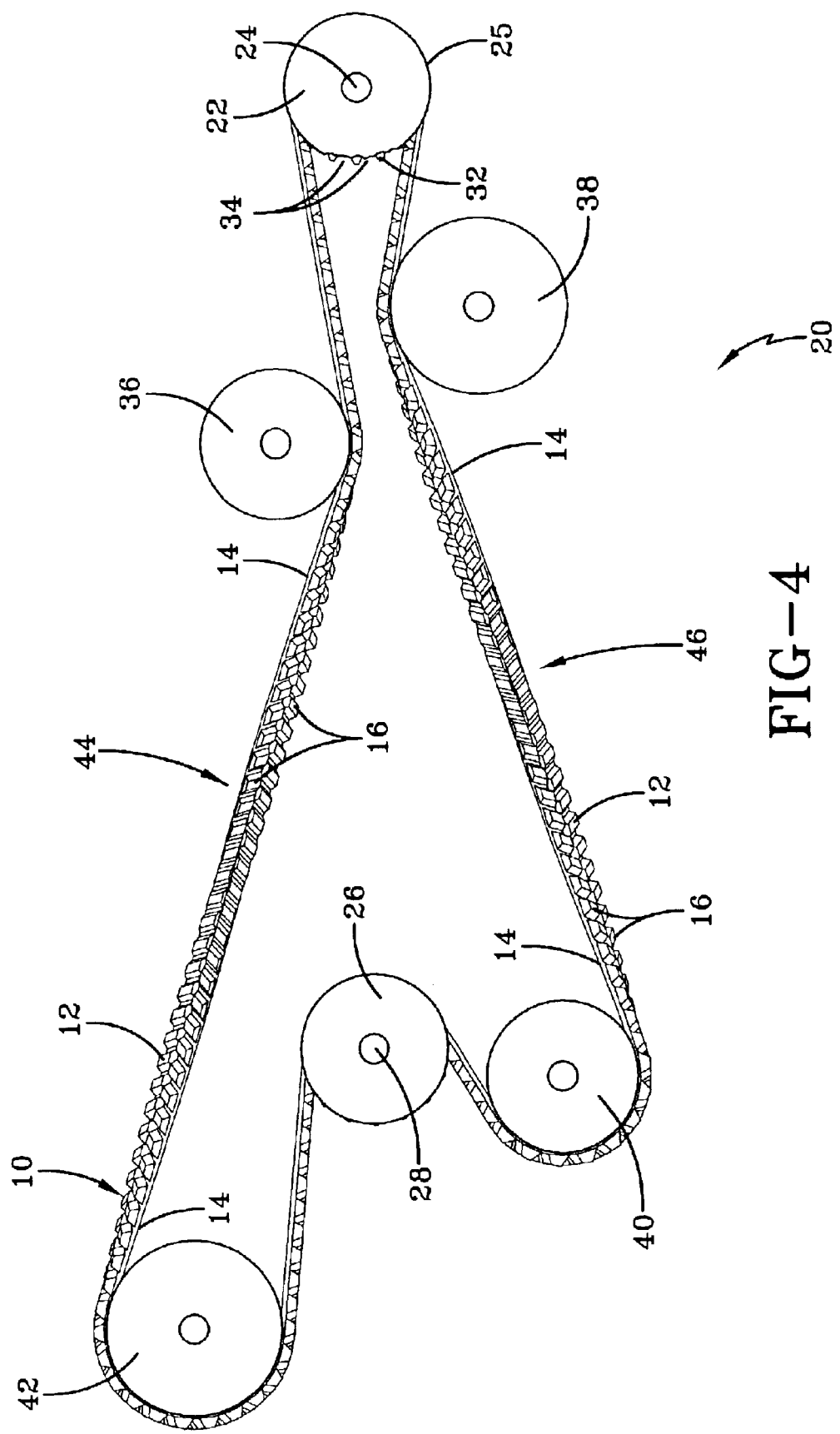
FIG. 4 is a schematic view of a positive drive belt system utilizing the belt of FIGS. 1–3 in accordance with the present invention.

The system 20, with reference to FIGS. 1 and 4, includes a driver pulley 22 having a center shaft 24 and a toothed perimeter 25. One or more driven pulley(s) 26 may be driven by the belt 10, each driven pulley having a center shaft 28. The driver pulley 22 and the driven pulley 26 each include a perimeter series of complimentary teeth 32 evenly spaced apart about an outer circumference. Adjacent teeth 32 are separated by a cavity 34 having a prescribed geometry and configuration as taught by U.S. Pat. No. 5,421,789, incorporated herein by reference. Cavities and teeth of other configuration may also be employed. Cavities 34 are shaped to receive in meshing engagement the teeth 16 of the belt 10. One or more idler, or routing, pulleys 36, 38, 40, and 42 may be deployed as needed for a particular application. The pulleys may be made from metal, thermoplastic or thermosetting materials.

As shown in FIG. 4, a system 20 incorporating belt 10 in a continuous loop is shown. The belt toothed side 12 engages the toothed perimeter 25 of the driver pulley 22 which is rotatably driven thereby. The belt 10 is routed across the pulley 36 and proceeds to pulley 42. Substantially midway between the pulley 36 and idler pulley 42 a first 180 degree twist 44 is introduced into the belt such that the downward facing toothed surface at the pulley 36 is upwardly oriented at pulley 42. The toothed surface 12 of the belt 10, accordingly, that was downwardly oriented leaving pulley 36, by virtue of twist 44, is oriented upward at idler pulley 42. The non-toothed smooth surface 14 of the belt 10 engages pulley 42 and is routed toward the driven pulley 26. It will be appreciated that a clockwise rotation of the driver pulley 22 will cause the belt segment extending to pulley 36 and pulley 42 to move to the right as seen in FIG. 4. Rightward movement of the belt causes pulley 36 to rotate counterclockwise. The twist 44 reorients the belt prior to the idler pulley 42 and driven pulley 26 such that the belt is moving leftward as it routes over pulley 26. The toothed surface 12 of the belt 10 engages the driven pulley 26 and causes it to rotate counterclockwise. Pulley 26 is thereby driven in a direction opposite to the driver pulley 22.

As the belt 10 loops around pulley 26, and is routed back to the driver pulley 22, it passes and engages idler pulley 40. Substantially midway between idler pulley 40 and pulley 38, a second 180 degree twist is introduced into the belt as shown at 46. The reoriented belt 10 is routed over pulley 38 and returns to driver pulley 22.

The purpose of the twin twists 44, 46 is to allow counter-rotation of the driven pulley 26 relative to driver pulley 22. The counter rotation is achieved by the aforementioned twist 44 between the driver and driven pulleys. The second twist 46 reorients the belt back into its original orientation relative to the driver pulley 22. The invention as embodied thus allows for the design of a belt drive system using standard one sided belting to achieve counter-rotation. Heretofore, dual sided belts were required to achieve a counter-rotation. In systems utilizing toothed belting, requiring that a dual sided toothed belt must be employed to achieve counter-rotation would mandating the fabrication and use of a specialized belt for such applications. Creation of a dual sided toothed belt, because of manufacturing and performance requirements, is costly and prohibitively discourages the development and utilization of counter-rotational pulley systems.

Variations in the present invention are possible in light of the description of it provided herein. While certain representative embodiments and details have been shown or the purpose of illustrating the subject invention, it will be apparent to those skilled in his art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A belt drive system comprising:
   a positive drive belt comprised of a base carrier strip having at least one row of drive teeth spaced apart along a first belt side and a non-toothed opposite second side;
   a driver pulley engaging the first side of the drive belt and axially driving the belt, the driver pulley rotating in a first direction;
   at least one driven pulley operatively engaged and rotated by the teeth along the drive belt first side, the drive belt extending to the driven pulley from the driver pulley in a closed, non-crossing loop path;
   a first longitudinal twist disposed within the drive belt between the driver pulley and the driven pulley, the first twist inverting the mutual orientation of the belt first and second sides from an initial orientation into an inverted orientation, whereby the driven pulley rotates in a direction opposite the driver pulley.

2. A belt drive system according to claim 1, wherein further comprising a second longitudinal twist disposed within the drive belt between the driven pulley and the driver pulley, the second twist inverting the mutual orientation of the belt first and second sides back into the initial orientation.

3. A belt drive system according to claim 2, wherein the belt comprises a synchronous transmission belt.

4. A belt drive system according to claim 1, wherein the drive belt is comprised of a resilient elastomer and the second side of the belt is substantially smooth.

5. A belt drive system comprising:
   a positive drive belt comprised of a base carrier strip having at least one row of spaced apart drive teeth disposed along a first belt side and a non-toothed opposite second side;
   a driver pulley engaging the first side of the drive belt and axially driving the belt, the driver pulley rotating in a first direction;
   at least one driven pulley operatively engaged and rotated by the teeth along the drive belt first side, the drive belt extending in a closed non-crossing loop path between the driven pulley and driver pulley;
   first re-orientation means disposed between the driver pulley and the driven pulley for inverting the mutual orientation of the belt first and second sides from an initial orientation into an inverted orientation, whereby the toothed first side of the drive belt engages the driven pulley.

6. A belt drive system according to claim 5, wherein the first re-orientation means rotates the drive belt substantially 180 degrees.

7. A belt drive system according to claim 6, wherein the first re-orientation means comprises a first twist.

8. A belt drive system according to claim 5, further comprising a second re-orientation means disposed between the driven pulley and the driver pulley for inverting the mutual orientation of the belt first and second sides from the inverted orientation into the initial orientation, whereby the toothed first side of the drive belt is oriented to engage the driver pulley.

9. A belt drive system according to claim 8, wherein the drive belt is a continuous endless loop.

10. A belt drive system according to claim 8, wherein the second re-orientation means comprises a second twist.

11. A belt drive system according to claim 8, wherein the drive pulley rotates in a direction opposite to the driven pulley.

12. A method for driving a driven pulley in a direction opposite to that of a driver pulley by means of a belt having a series of teeth along a first belt side and an opposite non-toothed second belt side, comprising the steps:

extending the belt between the driven and driver pulley in a closed non-crossing loop path;

rotatably engaging the driver pulley with the toothed first belt side;

forming a first twist in the belt between the driver pulley and the driven pulley;

driveably engaging the driven pulley with the toothed first side of the belt; forming a second twist in the belt between the driven pulley and the driver pulley.

13. A method according to claim 12, wherein the belt comprises a continuous endless loop.

14. A method according to claim 12, wherein the formation of the first twist in the belt comprises the step of mutually inverting the belt first and second sides substantially 180 degrees.

15. A method according to claim 14, wherein the formation of the second twist in the belt comprises the step of mutually inverting the belt first and second sides substantially 180 degrees.

16. A belt drive system comprising:

a positive drive belt comprised of a base carrier strip having at least one row of drive teeth spaced apart along a first belt side and a non-toothed opposite second side;

a driver pulley engaging the first side of the drive belt and axially driving the belt, the driver pulley rotating in a first direction;

at least one driven pulley operatively engaged and rotated by the teeth along the drive belt first side, the driven pulley and the driver pulley are mutually disposed to rotate about substantially parallel respective driven pulley and driver pulley axis;

a first longitudinal twist disposed within the drive belt between the driver pulley and the driven pulley, the first twist inverting the mutual orientation of the belt first and second sides from an initial orientation into an inverted orientation, whereby the driven pulley rotates in a direction opposite the driver pulley.

17. A belt drive system according to claim 16 wherein the driven pulley and driver pulley axis lie substantially in a common plane.

18. A belt drive system according to claim 17 wherein the drive belt extends between the driven pulley and the driver pulley in a closed non-crossing loop path.

19. A belt drive system according to claim 16 wherein the drive belt extends between the driven pulley and the driver pulley in a closed, non-crossing, substantially planar, loop path.

* * * * *